United States Patent
Lee et al.

(10) Patent No.: US 11,089,446 B2
(45) Date of Patent: Aug. 10, 2021

(54) PORTABLE ELECTRONIC DEVICE, OPERATING METHOD FOR THE SAME, AND NON-TRANSITORY COMPUTER READABLE RECORDING MEDIUM

(71) Applicant: HTC Corporation, Taoyuan (TW)

(72) Inventors: Ching-Hao Lee, Taoyuan (TW);
Hsin-Hao Lee, Taoyuan (TW);
Pei-Ling Wu, Taoyuan (TW);
Neng-Tsung Tsai, Taoyuan (TW);
Darren Sng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 221 days.

(21) Appl. No.: 15/867,738

(22) Filed: Jan. 11, 2018

(65) Prior Publication Data
US 2019/0215663 A1     Jul. 11, 2019

(51) Int. Cl.
| H04W 4/10 | (2009.01) |
| H04M 1/67 | (2006.01) |
| H04M 1/72454 | (2021.01) |
| H04W 4/02 | (2018.01) |

(52) U.S. Cl.
CPC .............. *H04W 4/10* (2013.01); *H04M 1/67* (2013.01); *H04M 1/72454* (2021.01); *H04M 2250/12* (2013.01); *H04W 4/02* (2013.01)

(58) Field of Classification Search
CPC .... G06F 1/1626; G06F 1/1643; G06F 1/1684; G04F 3/0414
USPC ........................................................ 455/566
See application file for complete search history.

(56) References Cited

U.S. PATENT DOCUMENTS

| 8,547,342 | B2 * | 10/2013 | Stallings | ............. G06F 3/04883 345/173 |
| 8,595,810 | B1 * | 11/2013 | Ben Ayed | ........... H04L 63/0815 713/168 |
| 8,905,303 | B1 * | 12/2014 | Ben Ayed | ............ G06Q 20/223 235/375 |
| 9,304,621 | B1 * | 4/2016 | Wakim | .................. G06F 1/1692 |

(Continued)

FOREIGN PATENT DOCUMENTS

| CN | 103297603 | 9/2013 |
| CN | 103513763 | 1/2014 |

(Continued)

OTHER PUBLICATIONS

"Office Action of Taiwan Counterpart Application," dated Feb. 27, 2019, p. 1-p. 13.

(Continued)

*Primary Examiner* — Congvan Tran
(74) *Attorney, Agent, or Firm* — JCIPRNET

(57) ABSTRACT

A portable electronic device and an operating method for the same are provided. The portable electronic device includes a body, a sensor disposed on a body, and a processor disposed in the body. The operating method includes the following steps. Determining, by the processor, whether a squeezing event is occurring based on a squeezing action sensed by the sensor, where the squeezing action is performed by a hand which is grabbing the portable electronic device, and a position of the hand when grabbing is on the sensor. And, performing, by the processor, one of a plurality of talking procedures with one or more other electronic devices according to the squeezing event.

20 Claims, 5 Drawing Sheets

(56) References Cited

U.S. PATENT DOCUMENTS

| | | | |
|---|---|---|---|
| 2002/0107032 A1 | 8/2002 | Agness et al. | |
| 2009/0299743 A1* | 12/2009 | Rogers | H04M 1/274516 704/235 |
| 2010/0090564 A1* | 4/2010 | Oh | H04M 1/67 310/328 |
| 2010/0151916 A1* | 6/2010 | Baek | H04M 1/72519 455/567 |
| 2011/0053641 A1* | 3/2011 | Lee | G06F 1/1626 455/556.1 |
| 2012/0242617 A1* | 9/2012 | Lee | G06F 3/0418 345/174 |
| 2013/0009890 A1* | 1/2013 | Kwon | G06F 3/0484 345/173 |
| 2013/0232570 A1* | 9/2013 | Ota | G06F 21/316 726/19 |
| 2013/0275058 A1* | 10/2013 | Awad | G01L 1/205 702/42 |
| 2013/0344919 A1* | 12/2013 | Kim | G06F 3/042 455/566 |
| 2014/0028602 A1* | 1/2014 | Morinaga | G06F 1/1626 345/173 |
| 2014/0123003 A1* | 5/2014 | Song | G06F 1/1626 715/701 |
| 2014/0160010 A1* | 6/2014 | Jung | G06F 3/04883 345/156 |
| 2014/0287799 A1* | 9/2014 | Choi | G06F 3/0482 455/566 |
| 2014/0298187 A1* | 10/2014 | Shen | G06F 3/0482 715/739 |
| 2014/0366128 A1* | 12/2014 | Venkateswaran | H04L 63/08 726/19 |
| 2014/0375582 A1* | 12/2014 | Park | G06F 3/0414 345/173 |
| 2015/0205400 A1* | 7/2015 | Hwang | G06F 3/0488 345/654 |
| 2015/0278678 A1 | 10/2015 | Sharma et al. | |
| 2016/0110093 A1* | 4/2016 | S | G06F 3/04842 715/863 |
| 2016/0195925 A1* | 7/2016 | Nguyen | G06F 1/1637 345/156 |
| 2016/0253039 A1* | 9/2016 | Heo | G06F 3/0412 345/173 |
| 2016/0357298 A1* | 12/2016 | Kim | G06F 1/1626 |
| 2017/0046024 A1* | 2/2017 | Dascola | H04M 1/72522 |
| 2017/0078610 A1* | 3/2017 | Yang | H04N 5/63 |
| 2017/0090581 A1* | 3/2017 | Pothier | G06F 3/017 |
| 2018/0074645 A1* | 3/2018 | Lin | G06F 3/0416 |
| 2018/0126219 A1* | 5/2018 | Parvaneh | A61B 5/1125 |
| 2018/0288707 A1* | 10/2018 | Jeon | H02J 50/80 |
| 2018/0299996 A1* | 10/2018 | Kugler | G06F 3/045 |
| 2018/0300004 A1* | 10/2018 | Kugler | G06F 3/0414 |
| 2018/0364763 A1* | 12/2018 | Shim | G06F 1/1656 |
| 2019/0018461 A1* | 1/2019 | DeBates | G06F 1/1684 |
| 2019/0026008 A1* | 1/2019 | Yeo | G06F 1/1652 |
| 2019/0050128 A1* | 2/2019 | Lee | G06F 3/0488 |
| 2019/0107899 A1* | 4/2019 | Lu | G06F 3/0487 |
| 2019/0235703 A1* | 8/2019 | Yin | G06F 3/0488 |
| 2021/0117033 A1* | 4/2021 | Hong | G06F 1/1684 |

FOREIGN PATENT DOCUMENTS

| | | |
|---|---|---|
| CN | 106354414 | 1/2017 |
| CN | 106919292 | 7/2017 |
| CN | 107809500 | 3/2018 |
| TW | M534849 | 1/2017 |
| TW | 201709015 | 3/2017 |

OTHER PUBLICATIONS

Chia-Yao Lin et al., "Portable Electric Device, Operating Method for the Same, and Non-Transitory Computer Readable Recording Medium", Unpublished U.S. Appl. No. 15/594,851, filed May 15, 2017.

Chia-Yao Lin et al., "Portable Electronic Device, Operating Method for the Same, and Non-Transitory Computer Readable Recording Medium", Unpublished U.S. Appl. No. 15/699,155, filed Sep. 8, 2017.

"Office Action of China Counterpart Application", dated Aug. 24, 2020, p. 1-p. 14.

* cited by examiner

PORTABLE ELECTRONIC DEVICE, OPERATING METHOD FOR THE SAME, AND NON-TRANSITORY COMPUTER READABLE RECORDING MEDIUM

BACKGROUND OF THE INVENTION

1. Field of the Invention

The disclosure relates to a portable electronic device, an operating method for the same, and a non-transitory computer readable recording medium, and more particularly to a portable electronic device comprising an edge sensor, an operating method for the same, and a non-transitory computer readable recording medium.

2. Description of Related Art

Currently, a conventional portable electronic device such as a cell phone, etc., has a touch screen on a front surface thereof, which is provided for displaying an image or sensing a touch action from a user. The conventional portable electronic device can perform a functional operation according to the sensed touch action or other input operation made by a user of the conventional electronic device. More particular, for performing/controlling the functional operation of the conventional portable electronic device, the user needs to first identify/see location(s) of visual/physical button(s) corresponding to the functional operations on the conventional electronic device, and then performs input operation/touch operation onto the visual/physical button(s) to execute the corresponding function operations. However, in some circumstances, it is not convenient for the user to identify/see the location of the button(s) for performing the desired function operation.

SUMMARY OF THE INVENTION

The present invention concerns a portable electronic device, an operating method for the portable electronic device, and a non-transitory computer readable recording medium.

According to a concept of the present invention, an operating method for a portable electronic device is provided. The portable electronic device comprises a body, an edge sensor disposed on an edge of the body, and a processor disposed in the body. The operating method comprises the following steps. Determining, by the processor, whether a squeezing event is occurring based on a squeezing action sensed by the edge sensor, wherein the squeezing action is performed by a hand which is grabbing the portable electronic device, wherein a position of the hand when grabbing is on the edge sensor. Performing, by the processor, one of a plurality of talking procedures with one or more other electronic devices according to the squeezing event.

According to another concept of the present invention, a non-transitory computer readable recording medium for storing one or more programs is provided. The one or more programs causing a processor to perform the above operating method after the one or more programs are loaded and executed by the processor.

According to yet another concept of the present invention, a portable electronic device is provided. The portable electronic device comprises a body and an edge sensor disposed on an edge of the body, wherein a processor is disposed in the body. The processor determines that a squeezing event is occurring when a squeezing action is sensed by the edge sensor, wherein the squeezing action is performed by a hand which is grabbing the portable electronic device, wherein a position of the hand when grabbing is on the edge sensor. And, the processor performs one of a plurality of talking procedures with one or more other electronic devices according to the squeezing event.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
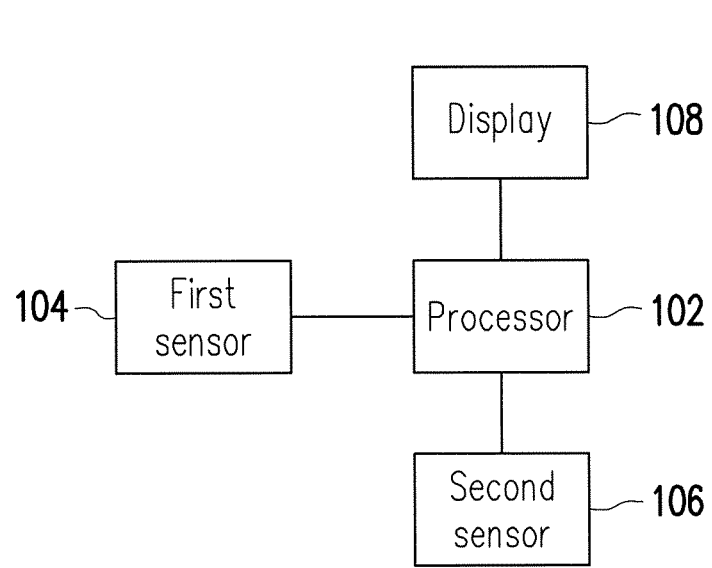
FIG. 1 is a block diagram of a portable electronic device according to an embodiment of the invention.

Preferred embodiments of the invention will now be described in detail, examples of which are illustrated in the accompanying drawings. Wherever possible, the same reference numbers are used in the drawings and the description to refer to the same or like parts.

Figure 2:
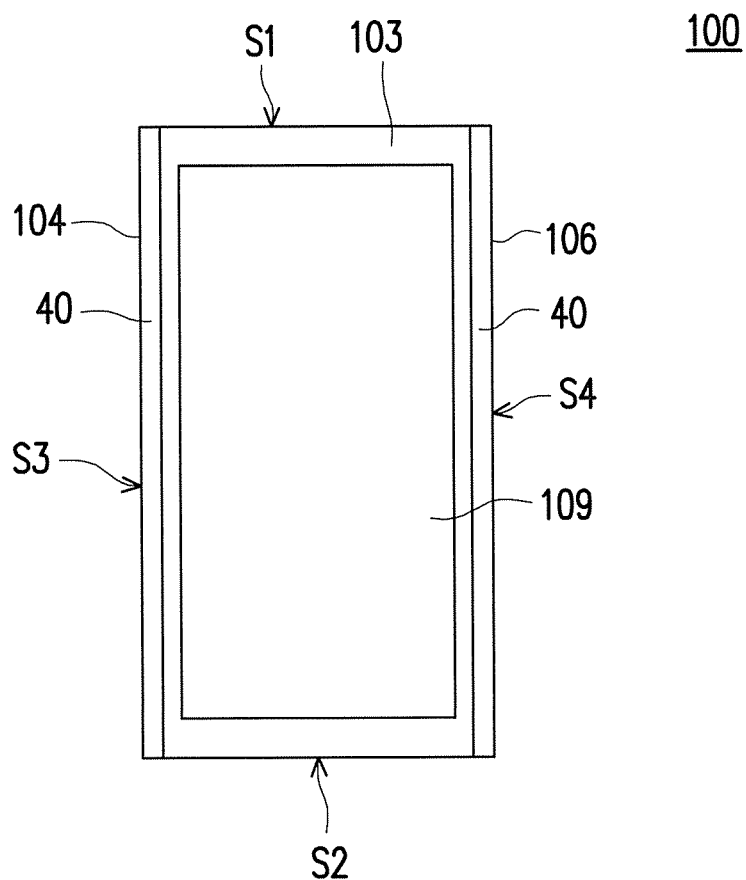
FIG. 2 is a schematic diagram of the portable electronic device according to an embodiment of the invention.

FIGS. 1 and 2 are a block diagram and a schematic diagram respectively of a portable electronic device according to an embodiment of the invention. In the embodiment concerning FIGS. 1 and 2, a first sensor 104 and a second sensor 106 each include an edge sensor 40 disposed on an edge of a body 103 of a portable electronic device 100. A display 108 includes a touch screen 109 disposed on the body 103. The first sensor 104, the second sensor 106 and the display 108 are coupled to a processor 102. For example, the portable electronic device 100 may be a smart phone or a tablet. The portable electronic device 100 includes a first side S1, a second side S2, a third side S3, and a fourth side S4. The first side S1 and the second side S2 are short sides of the portable electronic device 100, and the third side S3 and the fourth side S4 are long sides of the portable electronic device 100. The first sensor 104 (e.g., the edge sensor 40 disposed on the third side S3 of an edge of the body 103) and the second sensor 106 (e.g., the edge sensor 40 disposed on the fourth side S4 of the edge of the body 103) are, for example, pressure sensors, resistive sensors, light sensors or ultrasonic sensors. Based on specific requirements of the present invention, the first sensor 104 or the second sensor 106 may be disposed on at least one long side of the electronic apparatus; however, the present invention is not limited thereto. In another embodiment, only one edge sensor is disposed on one edge of the body.

The processor 102 may include central processing units (CPUs) of the portable electronic device 100 and, thus, control the overall operation of the portable electronic device 100. In certain embodiments, the processor 102 accomplishes this by loading software or firmware stored in a non-transitory computer readable recording medium (or other storage device/circuit), and executing the software or firmware thereof, so as to implement the operating method provided in the embodiment. The processor 102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The touch screen 109 may include a display unit and a touch unit. The display unit includes, for example, a liquid-crystal display (LCD), a plasma display, a vacuum fluorescent display, a light-emitting diode (LED) display, a field emission display, and/or other suitable types of display configured to display a user interface, or other image content. The touch unit includes, for example, a resistive touch sensor, a capacitive touch sensor, and/or other suitable types of touch sensor configured to detect a touch operation (action) performed on the touch screen 109.

As mentioned above, the first sensor 104 and the second sensor 106 are respectively disposed on the third side S3 and fourth side S4 of the portable electronic device 100. The first sensor 104 and the second sensor 106 each includes a plurality of sensing components which are arranged in a line. When a user activates the first sensor 104 or/and the second sensor 106 of the portable electronic device 100 by performing an action such as touching, pressing, sliding, or squeezing on one or two long sides (one or two sides of the third side S3 and the fourth side S4) of the portable electronic device 100, these sensing components output corresponding signals (to the processor 102), and the first sensor 104 and the second sensor 106 sense the performed action. The processor determines an event corresponding to the performed action is occurring when the processor receives the signals corresponding to the performed action from the first sensor 104 and the second sensor 106. The processor 102 determines the force with which the action is applied on the edge according to the signals outputted from the sensing components of the first sensor 104 or/and the second sensor 106 when the first sensor 104 or/and the second sensor 106 of the portable electronic device 100 is/are activated by the user, such that the processor 102 may determine the strength of an event (e.g., the strength of a squeezing event). Furthermore, the processor 102 determines the period of time or duration during which the performed action is continuously applied to the edge according to the signals outputted from the sensing components of the first sensor 104 or/and the second sensor 106, such that the processor 102 may determine the duration of an event (e.g., the duration of a squeezing event). Moreover, the processor 102 determines the activated positions on the long side of the portable electronic device 100 according to the positions of the sensing components which are activated by the action performed by the user, such that a sliding action, and the position thereof may be sensed (determined). The user's actions, which may be sensed by the edge sensors, may include squeezing the portable electronic device 100 (i.e., pressing both the third side S3 and the fourth side S4 on which the first sensor 104 and the second sensor 106 are respectively disposed), sliding along the long side of the portable electronic device 100 (which will be explained in more detail with reference to FIG. 7 hereinafter), and touching the edges of the third side S3 and the fourth side S4 of the portable electronic device 100.

Figure 3:
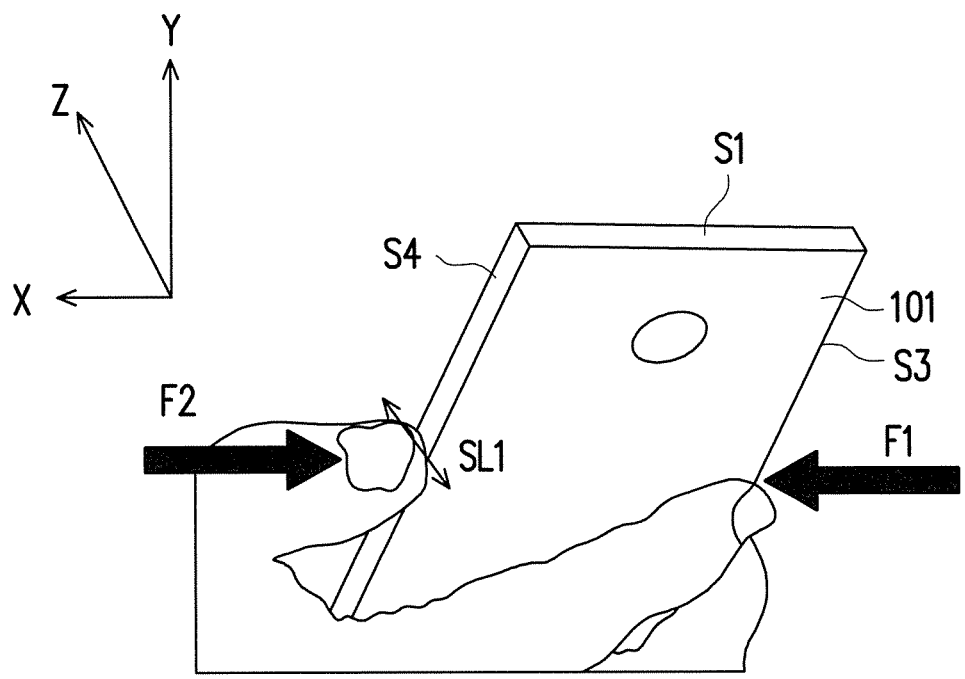
FIG. 3 is a schematic diagram of the portable electronic device when a user grabs/holds and squeezes the portable electronic device according to an embodiment of the invention.

The schematic diagram of FIG. 3 shows the portable electronic device being grabbed/held and squeezed by the user according to an embodiment of the invention. Referring to FIG. 3, the sensed "squeezing action" represents the user grabbing/holding the portable electronic device 100 as illustrated in FIG. 3, and pressing the edges (the edge of the third side S3 and the edge of the fourth side S4) of the portable electronic device 100 firmly with fingers or hands by applying forces F1 and F2. For example, by setting an orthogonal coordinate system on the portable electronic device as illustrated in FIG. 3 (with the x axis direction extending from the third side S3 to the fourth side, the y axis direction extending from the second side S2 to the first side S1, and the z axis direction extending from the rear cover 101 to the front cover of the portable electronic device), the direction of the force F1 is then in the positive x direction, and that of the force F2 is in the negative x direction. The sensed "squeezing action" represents the user grabbing/holding the portable electronic device 100 as illustrated in FIG. 3, and pressing the edges (the edge of the third side S3 and the edge of the fourth side S4) of the portable electronic device 100 firmly with fingers or hands by applying forces F1 and F2.

In the embodiment, when the signal level (voltage level) of the signals outputted from the sensing components of the first sensor 104 and the second sensor 106 exceed a squeeze threshold, a squeezing action is sensed by the first sensor 104 and the second sensor 106, and the processor 102 determines that a squeezing event is occurring. Conversely, in another embodiment, when the signal level of the signals outputted from the sensing components of the first sensor 104 and the second sensor 106 does not exceed the squeeze threshold, a touching action may be sensed by the first sensor 104 and the second sensor 106, and the processor 102 may determine that a touch event is occurring.

In the embodiment, irrespective of whether the touch screen 109 is turned on or off, the edge sensor 40 (i.e., the first sensor 104 and the second sensor 106) continues sensing whether a user action is performed on the edge (the first sensor 104 and the second sensor 106) of the portable electronic device. However, in the following description, the embodiment is provided in the case where the touch screen 109 is turned off.

Figure 4:
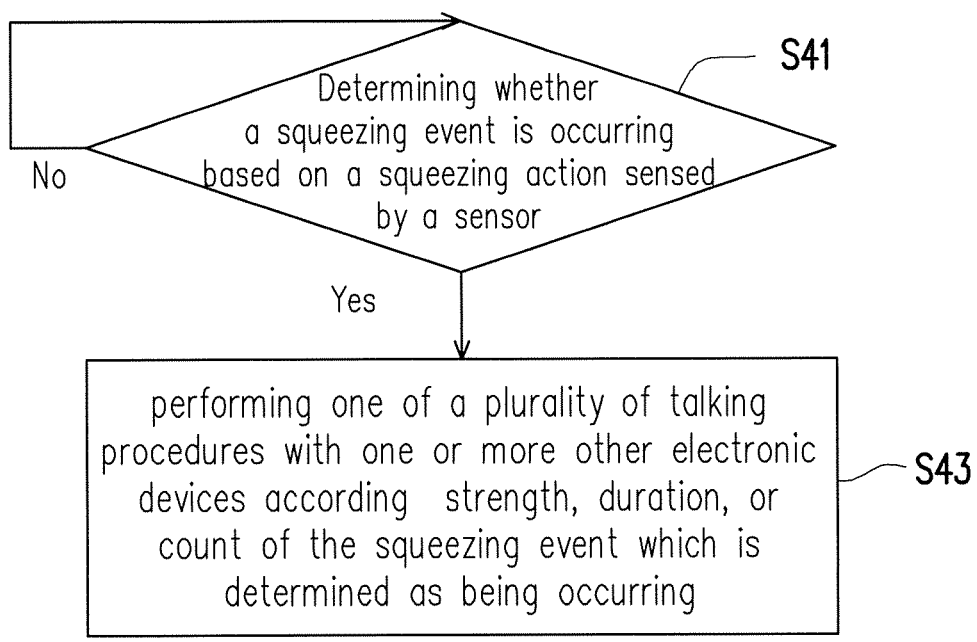
FIG. 4 is a flow chart of an operating method for a portable electronic device according to an embodiment of the invention.

The flow chart of FIG. 4 shows an operating method for a portable electronic device according to an embodiment of the invention. Referring to FIG. 4, in the step S41, the processor 102 determines whether a squeezing event is occurring based on a squeezing action is sensed by an edge sensor of a portable electronic device. Next, in response to determining that the squeezing event is occurring (S41→Yes), in the step S43, the processor performs one of a plurality of talking procedures with one or more other electronic devices according to strength, duration, or count of the squeezing event the squeezing event which is determined as being occurring. Specifically, the plurality of talking procedures at least includes a walkie-talkie procedure (referred to as a first talking procedure, hereinafter), and a voice message procedure (referred to as a second talking procedure, hereinafter). In the embodiment, the talking procedures may be performed by executing corresponding program code or applications by the processor 102. The processor 102 performs a first talking procedure of the plurality of talking procedures in response to determining that the squeezing event is the first squeezing event; and performs a second talking procedure of the plurality of talking procedures in response to determining that the squeezing event is the second squeezing event, wherein the first talking procedure is different from the second talking procedure. In response to determining that the squeezing event is not occurring (S41→No), the whole process would be back to step S41.

In the embodiment, the processor 102 determines whether the squeezing event is a first squeezing event or a second squeezing event by comparing the strength with a strength threshold, by comparing the duration with a time threshold, or by comparing the count with a count threshold. For example, in the embodiment, the squeezing event is determined as the first squeezing event in response to determining that the duration of the squeezing event is longer than the time threshold, and the squeezing event is determined as the second squeezing event in response to determining that the duration of the squeezing event is not longer than the time threshold. In another embodiment, the squeezing event is determined as the first squeezing event in response to determining that the strength of the squeezing event is larger than the strength threshold, and the squeezing event is determined as the second squeezing event in response to determining that the strength of the squeezing event is not larger than the strength threshold. In another embodiment, the squeezing event is determined as the first squeezing event in response to determining that the count of the squeezing event is smaller than the count threshold, and the squeezing event is determined as the second squeezing event in response to determining that the count of the squeezing event is not smaller than the count threshold. The count of the squeezing event is obtained, by the sensor, by counting one or more squeezing actions corresponding to the squeezing event. Specifically, when the edge sensor 40 sensed a squeezing action first time (e.g., a first squeezing action), the edge sensor 40 start to count the number of times of squeezing action(s) sensed within a time period (which is starting from the first squeezing action) as the count of the squeezing event.

In another embodiment, the first or second talking procedure may b performed directly by enabling application/APP corresponding to first or second talking procedure without determining the occurring squeezing event, and then one or more functions of the first or second talking procedure may be performed according to a squeezing event occurred during the period of the first or second talking procedure. In further another embodiment, the second talking procedure may be performed after performing the first talking procedure. For example, after performing the first talking procedure, the processor 102 may determine whether one of a plurality of contacts (i.e. one or more other electronic devices (recipient devices)) for the first talking procedure is online (i.e., has been connected with the portable electronic device). When all of the contacts are offline, the processor 102 may terminate the first talking procedure and perform the second talking procedure. Then, one of the contacts may be selected for the second talking procedure. The contacts may be customized.

When performing the first talking procedure, the processor 102 may start to receive a voice (e.g., a sound of talking made by a user near the portable electronic device 100) via a sound input device, such as a microphone, of the portable electronic device 100, generate (by the processor 102) a voice signal according to the received voice, and send (through a communication circuit disposed in the portable electronic device or an internet connection built between the portable electronic device and the recipient devices) the voice signal to one or more other electronic devices (recipient devices) which are also performing the first talking procedure, wherein the recipient devices may be in the same channel as the portable electronic device, or the recipient devices may be the contacts of the portable electronic device for the first talking procedure. Furthermore, while the first talking procedure is performed, the processor 102 may receive voice signals sent by the recipient devices which perform the first talking procedure, and output voice corresponding to the received voice signals (through a sound output device, such as a speaker, of the portable electronic device 100).

Figure 5:
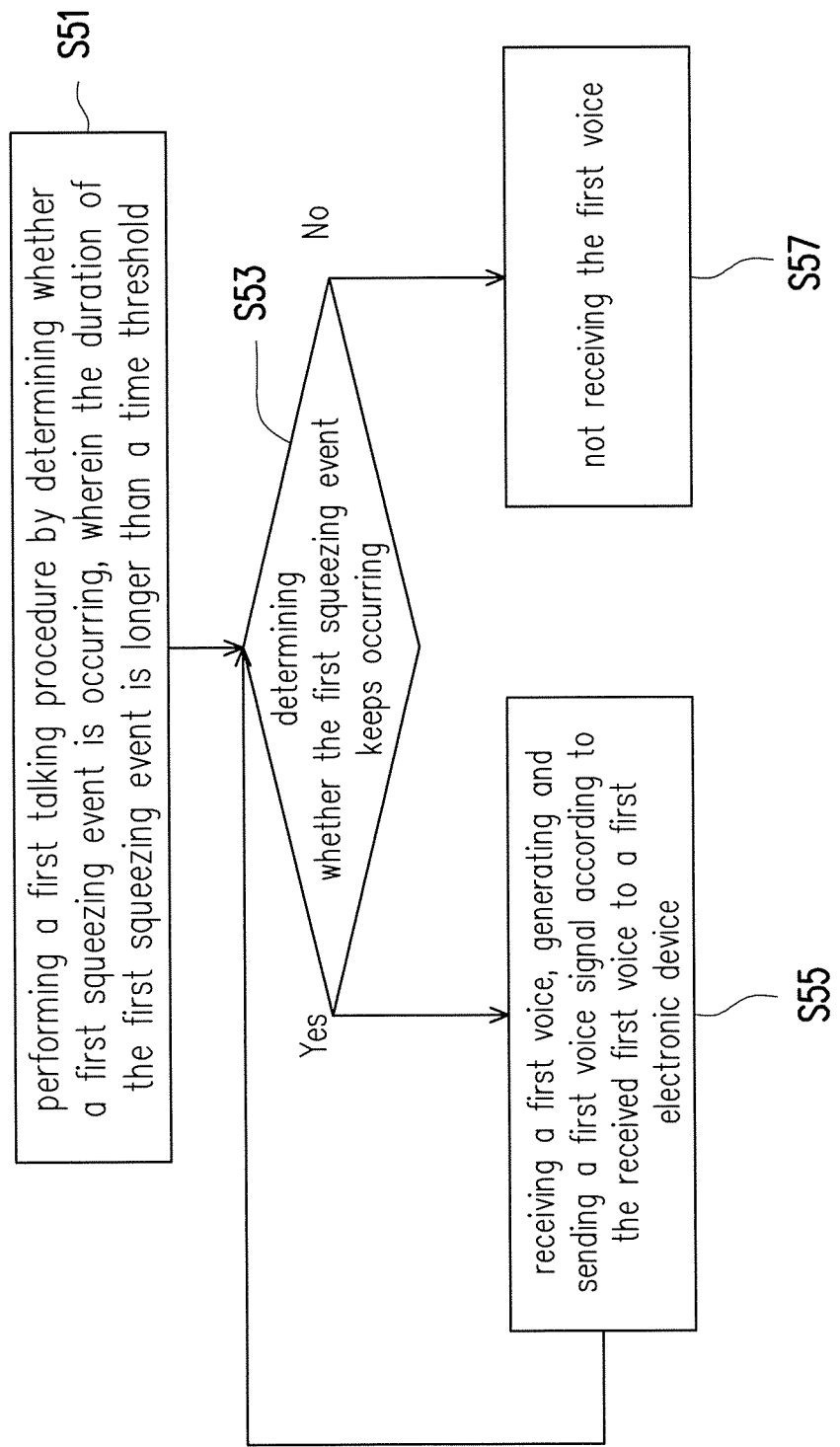
FIG. 5 is a flow chart of a talking procedure according to an embodiment of the invention.

The flow chart of FIG. 5 shows a talking procedure according to an embodiment of the invention. Referring to FIG. 5, in step S51, the processor 102 performs a first talking procedure by determining whether a first squeezing event is occurring, wherein the duration of the first squeezing event is longer than a time threshold. Specifically, in the foregoing description, the processor 102 may determine the duration of a squeezing event. The processor 102 may determine whether the duration of the squeezing event is longer than a time threshold.

If the duration of the squeezing event is longer than the time threshold, the processor 102 determines the squeezing event as a first squeezing event (determines that the first squeezing event is occurring) and then the processor 102 performs the first talking procedure. If the duration of the squeezing event is not longer than the time threshold, the processor 102 determines the squeezing event as a second squeezing event (determines that the second squeezing event is occurring) and then the processor 102 performs the second talking procedure.

Next, in step S53, the processor 102 determines whether the first squeezing event keeps occurring. Specifically, after determining that the first squeezing event s occurring, the processor 102 may continuously determine whether this first squeezing event has stopped occurring by determining whether the signals corresponding to the squeezing action have stopped being outputted to the processor 102. Once the output signal corresponding to the first squeezing action has stopped (and is no longer being outputted), the processor 102 determines that the first squeezing event has stopped occurring (and does not keep occurring). In another embodiment, once the signal level (e.g., voltage level or the output signal) of the output signal corresponding to the first squeezing action does not exceed the squeeze threshold, the processor 102 determines that the first squeezing event has stopped. If the output signals corresponding to the first squeezing event keep being output to the processor 102, the processor 102 then determines that the first squeezing event keeps occurring, and the next step is step S55. In an embodiment, when starting to receive the voice (S53→Yes), the processor 102 may generate a start-talking notify signal, and the portable electronic device 100 may correspondingly generate a start-talking notification (e.g., a sound, a dynamic or static image, a message, a vibration signal, a light signal, or a combination thereof), so as to notify the user that the portable electronic device is starting to receive the voice, as it may be useful for the user to know that the portable electronic device 100 has started to receive the voice.

In step S55, the processor 102 receives a first voice, and then generates and sends a first voice signal according to the received first voice to a first electronic device. Specifically, in response to determining that the processor 102 performs the first talking procedure and the first squeezing event is keeping occurring, during the entire duration of the first squeezing event, the processor 102 may control a sound input device (e.g., the microphone of the portable electronic device 100) to receive a voice (referred to as the first voice, hereinafter). The first voice may be a sound of talking of a user near the portable electronic device. Furthermore, the first voice may be any type of sound near the portable electronic device. The microphone may convert the received voice to corresponding current, and send the current to the processor 102. The processor 102 correspondingly generates a voice signal (referred to as the first voice signal), and sends the generated first voice signal to one or more other electronic devices (recipient device). The one or more recipient devices may be selected by the user of the portable electronic device, and the one or more recipient devices are devices in the same channel to which the portable electronic device belongs. For convenience, in the following embodiment, the recipient device is one of the other electronic devices (referred to as the first electronic device). In another embodiment, the microphone (or other types of sound input device) may convert the received voice (sound) directly to the voice signal (sound signal), and send it to the processor 102.

In the embodiment, while receiving the first voice, the processor may keep performing step S53 to determine whether the first squeezing event keeps occurring. In other words, in response to the processor 102 determines that the first squeezing event does not keep occurring (i.e. has stopped), the processor 102 may then perform step S57.

In step S57, the processor 102 may signal to the microphone (sound input device) to not receive the first voice (i.e. to stop receiving the first voice). Accordingly, the first voice signal is not be generated or sent in step 57. In other words, the sending by the user of the sound of talking via the portable electronic device 100 to the first electronic device is stopped. The processor 102 may continue to perform step S51 to determine whether another first squeezing event is occurring, so as to perform the subsequent steps. In an embodiment, at step S57, when receiving of the voice is stopped (S53→No), the processor 102 may generate another stop-talking notify signal, and the portable electronic device 100 may correspondingly generate a stop-talking notification (e.g., a sound, a dynamic or static image, a message, a vibration signal, a light signal, or a combination thereof), so as to notify the user that the portable electronic device has stopped receiving the voice, as it may be useful for the user to know that the portable electronic device 100 has stopped receiving the voice.

In the embodiment, when the processor 102 receives a voice signal (referred to as the second voice signal) sent from the first electronic device (through communication circuit disposed in the portable electronic device 100 or an internet connection built between the portable electronic device and the first electronic device), the processor 102 performs the first talking procedure, and signals to a sound output device (e.g., a speaker) of the portable electronic device 100 to output a voice (referred to as the second voice) according to the received second voice signal. In other words, when the processor 102 performs the first talking procedure and a voice signal (generated during the first talking procedure performed by another electronic device) is received from the another electronic device, the portable electronic device 100 would output voice corresponding to the received voice signal.

In the embodiment, when the first electronic device receives the first voice signal sent from the portable electronic device 100, the first electronic device generates a confirmation signal, and sends it to the portable electronic device 100, so as to inform the portable electronic device 100 that the first electronic device is receiving the first voice signal. In more detail, the portable electronic device 100 (the processor 102) may determine whether a confirmation signal generated by the first electronic device is received by the portable electronic device. In response to determining that the portable electronic device 100 (the processor 102) receives the confirmation signal sent from the first electronic device, the processor 102 may generate a notification event, and the portable electronic device 100 may correspondingly generate a notification, so as to let the user know that the first electronic device is receiving the first voice.

Figure 6:
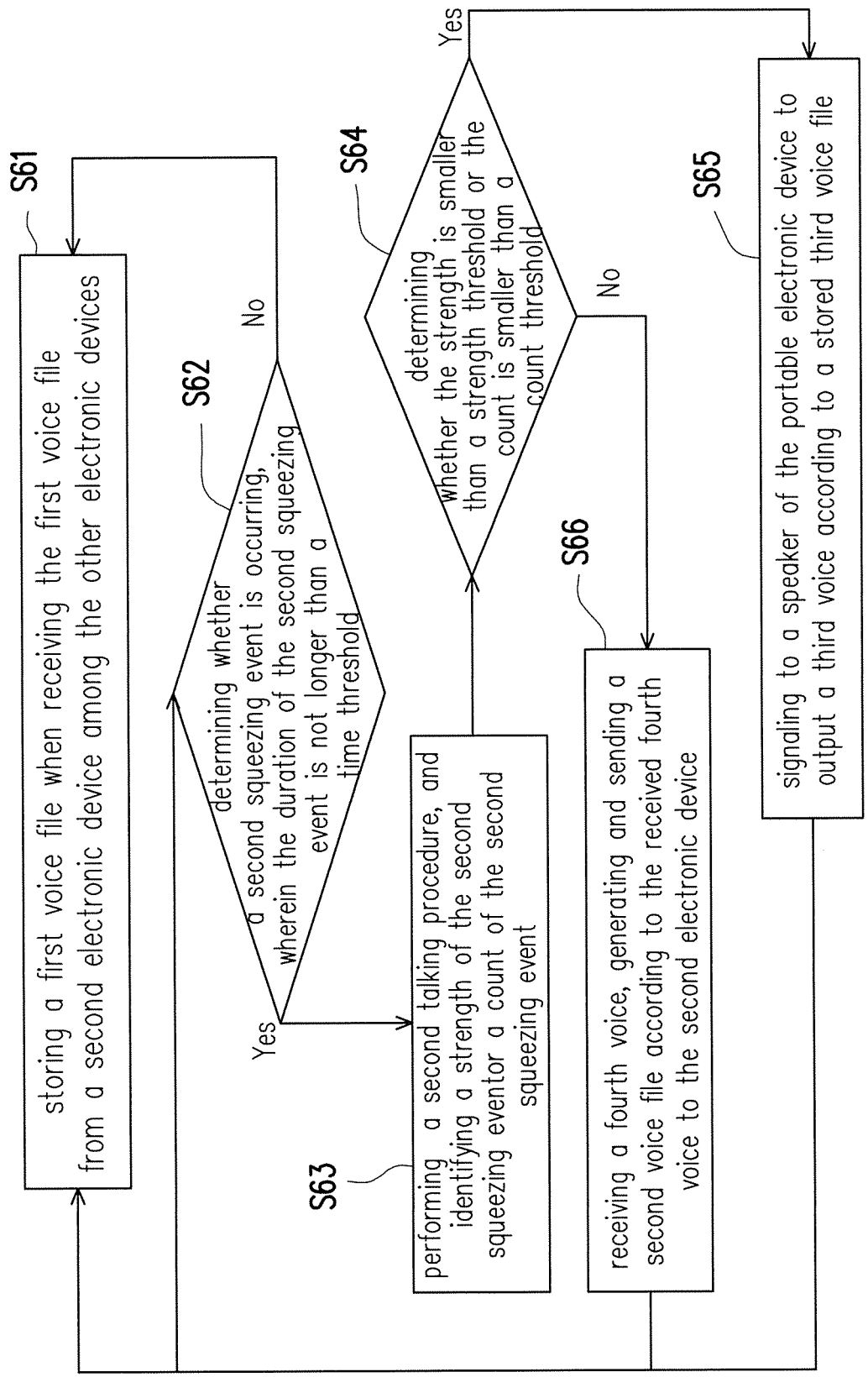
FIG. 6 is a flow chart of a talking procedure according to another embodiment of the invention.

The flow chart of FIG. 6 shows a talking procedure according to another embodiment of the invention. Referring to FIG. 6, in step S61, the processor 102 stores a first voice file when the processor 102 receives the first voice file from a second electronic device among the other electronic devices. Specifically, the portable electronic device 100 may receive a voice file (referred to as a first voice file) sent from another electronic device (referred to as a second electronic device) through a communication circuit disposed in the portable device, or an internet connection built between the portable electronic device and the recipient devices. After receiving the first voice file, the processor 102 stores the first voice file into a buffer of a memory or storage circuit/device of the portable electronic device 100. The stored voice file(s) in the buffer may be managed in a manner of FIFO (First-In-First-Out). Namely, a voice file first stored into the buffer would be the voice file to be outputted first.

In the meantime, the processor 102 performs step S62. In step S62, the processor 102 determines whether a second squeezing event is occurring, wherein the duration of the second squeezing event is not longer than a time threshold. Specifically, the processor 102 determines whether the duration of the squeezing event is longer than a time threshold. If the duration of the squeezing event is not longer than the time threshold, the processor 102 determines the squeezing event as a second squeezing event (determines that the second squeezing event is occurring). Furthermore, if the duration of the squeezing event is longer than the time threshold, back to step is step S61, and the processor 102 may determines the squeezing event as a first squeezing event (determines that the first squeezing event is occurring).

If the processor 102 determines that the second squeezing event is occurring, then the next step is step S63, where the processor 102 performs a second talking procedure (another talking procedure different from the first talking procedure), and identifies a strength of the second squeezing event or a count of the second squeezing event. Next, in step S64, the processor determines whether the strength is smaller than a strength threshold or the count is smaller than a count threshold.

If the strength of the second squeezing event is smaller than the strength threshold or the count of the second squeezing event is smaller than the count threshold, continue to step S65, where the processor 102 signals to a speaker of the portable electronic device 100 to output a second voice according to a stored third voice file (e.g., the first voice file received from the second electronic device, and stored in the buffer of the portable electronic device), wherein the third voice file is received from the second electronic device among the other electronic devices (after being received by the portable electronic device 100, the third voice file is then stored in the buffer by the processor 102). Specifically, the processor 102 outputs a voice according to the voice file(s) stored in the buffer in the manner of FIFO. For example, in response to determining that the strength of the second squeezing event is smaller than the strength threshold, the processor 102 identifies one or more voice files stored in the buffer, selects an oldest voice file (a voice file which is the earliest voice file stored in the buffer) among the one or more voice files stored in the buffer as the third voice file, and signals to the speaker (or other type of sound output device) to output the second voice according to the selected third voice file. In other words, the portable electronic device determines a small strength second squeezing action (or a specific number of times of second squeezing action) performed by the user, and accordingly outputs a voice according to the stored voice files. In an embodiment, when the third voice file has been selected and outputted as the third voice (and so the third voice file has been used), the processor 102 then deletes the third voice file from the buffer. Furthermore, the processor 102 generates and sends another confirmation message to the second electronic device that sent the third voice file, so as to let the second electronic device know that the sent third voice file has been listened to (that is, a corresponding third voice has been outputted by the portable electronic device).

After step S65 (e.g., after finishing outputting the third voice), the processor 102 continues with steps S61 and S62.

If the strength of the second squeezing event is not smaller than the strength threshold or the count of the second squeezing event is not smaller than the count threshold, the next step is step S66, where the processor 102 receives a third voice, generates and sends a second voice file according to the received third voice to the second electronic device. Specifically, as with step S55, in step S66, the processor 102 signals to the sound input device (e.g., the microphone of the portable electronic device 100) to receive a voice (referred to as the third voice, hereinafter). The third voice may be a sound of talking of the user near the portable electronic device. Furthermore, the third voice may be any type of sound near the portable electronic device 100. The microphone may convert the received third voice to corresponding current, and send the current to the processor 102. The processor 102 correspondingly generates a voice file (referred to as the second voice file), and sends the generated second voice file to the second electronic device. In other words, in response to determining that the second talking procedure is performed and the strength of the second squeezing event is not smaller than the strength threshold (or the count of the second squeezing event is not smaller than the count threshold), the portable electronic device 100 starts to record the third voice as the second voice file continuously, and sends it to the second electronic device. In the embodiment, when voice level of the fourth voice drops below a voice level threshold or when the fourth voice stops, the portable electronic device 100 stops recording the third voice, and accordingly obtains the second voice file. It should be mentioned, in another embodiment, the step S65 and step S66 may exchange each other.

After step S66 (e.g., after sending the second voice file), the processor 102 continues with steps S61 and S62.

As mentioned before, the processor 102 may determine whether the occurring squeezing event is a first squeezing event or a second squeezing event by comparing the strength or the count of the squeezing event with the strength threshold and the count threshold. Thus, in another embodiment, in step S62, the processor 102 may determine whether a second squeezing event is occurring, wherein the strength of the second squeezing event is not larger than the strength threshold or the count of the second squeezing event is not smaller than the count threshold. In step S63, the processor 102 may further identify the duration of the second squeezing event, and then, in step S64, the processor 102 may further determine whether the duration is longer than the time threshold, so as to perform step S65 or step S66.

Figure 7:
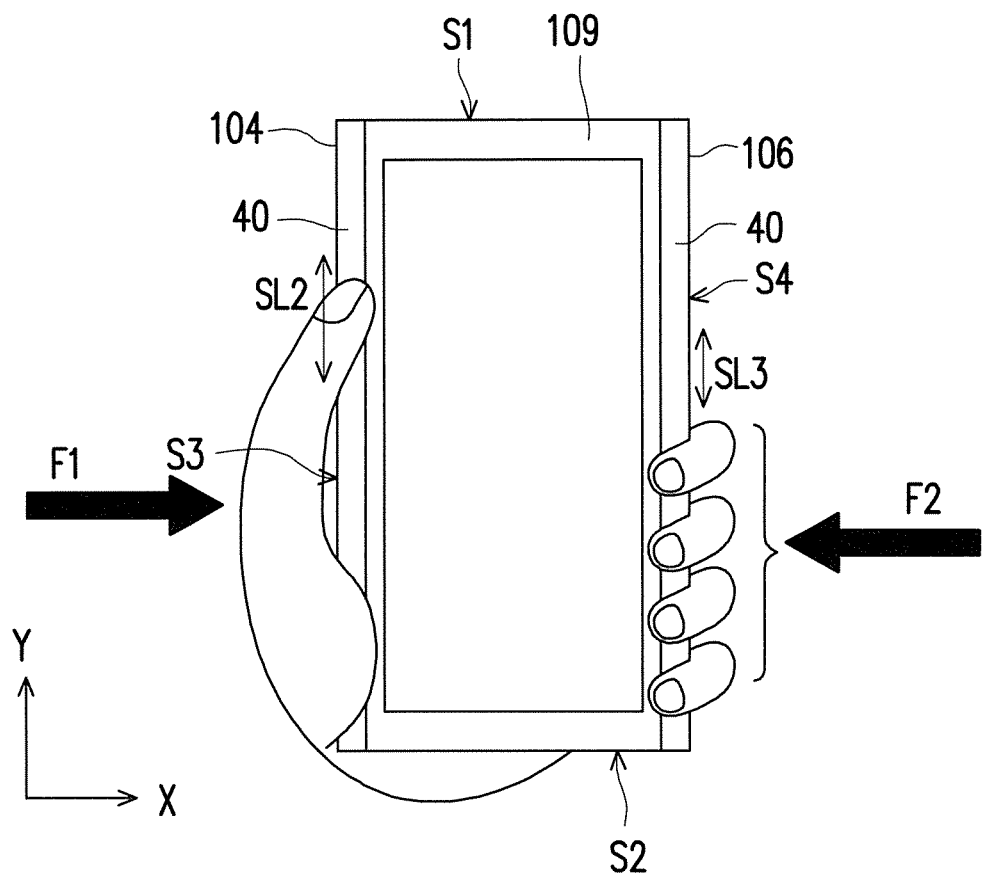
FIG. 7 is a schematic diagram of a sliding action performed on an edge of the portable electronic device according to an embodiment of the invention.

The schematic diagram of FIG. 7 shows a sliding action performed on the edge of the portable electronic device according to an embodiment of the invention. Referring to FIG. 7, in the embodiment, a slide (or sliding) action SL2 and SL3 is determined by the edge sensor 40 when the sensing components in the first sensor 104 or/and the second sensor 106 sense the position of a touch or a force applied thereon move along one or two of the long sides S3 and S4. According to the determined slide action, the processor 102 chooses another electronic device among the other electronic devices to perform a talking procedure. Specifically, when a slide action is sensed (determined), the processor 102 changes the electronic device engaged in for the first/second talking procedure from the original one to another according to the direction/position of the slide action. For example, assuming the processor 102 performs the second talking procedure and sends a voice file "A" to electronic device "A". When a slide action is determined as performed on the third side S3 along the positive Y direction, the processor 102 may change the electronic device for the second talking procedure from electronic device "A" to electronic device "B". Next, in response to determining that a strength of a second squeezing event is not smaller than the strength threshold according to the forces F1 and F2 applied on the edge sensor 40, the processor 102 records a voice as a voice file, and sends it to the electronic device "B". Next, if a slide action is determined as performed on the third side S3 along the negative Y direction, the processor 102 may change the electronic device for the second talking procedure from electronic device "B" back to electronic device "A".

Equivalently, in another embodiment, as depicted in FIG. 3, the slide action may be a slide action SL1 along the positive or negative Z direction. For example, in this embodiment, when a slide action SL1 along the Z direction is sensed, the processor 102 may display a channel/contact list which records a plurality of channels/contacts (e.g., enters a channel/contact selecting mode), and one of the channels/contacts in the contact list may be selected according to another slide action along the positive or negative Y direction (e.g., a channel/contact for the current talking procedure may be selected in the channel/contact selecting mode). When a contact is selected, the processor may build a connection between one or more electronic devices corresponding to the selected channel/contact and the portable electronic device 100 for the current talking procedure. In an embodiment, when entering the channel/contact selecting mode, or when a channel/contact is selected, the processor 102 may control the portable electronic device 100 to notify the user by sending a notification signal (e.g., the portable electronic device 100 may play a corresponding notification sound, voice message, or make a flash light to notify the user).

In an embodiment, when the voice signal or the voice file is sent to the recipient device by the processor 102, the processor 102 may also send location information corresponding to the portable electronic device 100 to the recipient device. The location information may be, for example, GPS locating information of the portable electronic device. If the recipient device receives the location information corresponding to the portable electronic device 100, the recipient device then knows the exact location of the portable electronic device.

In an embodiment, the processor 102 may perform one of a plurality of operations according to a sensed squeezing action (a squeezing event) and determined location information of the portable electronic device 100. For example, the processor 102 may obtain a location information corresponding to the portable electronic device 100 via a locating circuit disposed in the portable electronic device 100, so as to determine a location of the portable electronic device 100. Furthermore, the processor 102 may store a location-operation mapping table which records a plurality of (predetermined) locations and a plurality of (predetermined) operations respectively corresponding to the locations (the locations, the operations, and the mapping relationship between the locations and the operations may be configured by the user of the portable electronic device 100), and the operations may include one or more talking procedure. And, if the processor 102 receives location information indicating the portable electronic device is in a predetermined location (e.g., a hospital which is one of the locations in the location-operation mapping table), then a squeezing event may correspond to a first operation (e.g., a call operation which is mapping/corresponding to the hospital in the location-operation mapping table). Here, in response to the processor 102 determines that a squeezing event is occurring, the processor 102 performs the first operation (e.g., the call operation to send a call message to medical personnel in the hospital). The operations triggered by a squeezing event for given locations of the portable electronic device may be configured by the processor 102. In an embodiment, if the determined current location of the portable electronic device 100 is not one of the predetermined locations, the processor 102 would perform one of the talking procedure according to an occurring squeezing event.

In an embodiment, the duration of the talking process (i.e., the process in which the portable electronic device 100 receives a voice, generates and sends a corresponding voice signal to the recipient device) of the first talking procedure may be determined according to the squeezing events. For example, in response to determining that a squeezing event (referred to as a start-talking squeezing event) is occurring, the processor 102 starts to continuously receive a voice via the microphone of the portable electronic device, generate and send the corresponding voice signal to a recipient device without determining whether the squeezing event keeps occurring. Furthermore, in response to determining that another squeezing event (referred to as a stop-talking squeezing event and occurring after the start-talking squeezing event) is occurring, the processor 102 stops receiving the voice, so as to end the talking process of the first talking procedure.

In other embodiments, the processor 102 may determine the start-talking/stop-talking squeezing event of the first talking procedure according to other suitable conditions different from the foregoing condition. For example, another condition may be the number of times (count) of squeezing events (or a comparing result of the count and the count threshold). Specifically, in an embodiment, during the first talking procedure, in response to determining that the count of a sensed squeezing event is a first value (e.g., "1"), the processor 102 determines that it is a start-talking squeezing event (starts the talking process of the first talking procedure); and in response to determining that the count of a squeezing event is a second value (e.g., "2"), the processor 102 determines that it is a stop-talking squeezing event (ends the talking process of the first talking procedure). In another embodiment, during the first talking procedure, when a squeezing action is sensed, the processor 102 determines it is a start-talking squeezing event, and then starts to receive a voice. Then, when next squeezing action is sensed while the microphone is receiving the voice, the processor 102 determines it is a stop-talking squeezing event, and stops receiving the voice. For another example, another condition for determining the start-talking/stop-talking squeezing event of the first talking procedure may be the strength of the squeezing event.

In an embodiment, before performing a talking procedure according to a squeezing event, an authentication process may be executed by the processor 102, so as to maintain privacy in the voice communication of the user who has the permission to use the talking procedure. In response to the executed authentication process is passed, a corresponding talking procedure is allowed to be performed. On contrary, in response to the executed authentication process is not passed, a corresponding talking procedure is not allowed to be performed. For example, in response to determining that a second squeezing event of which the strength is smaller than the strength threshold is determined as occurring (e.g., the second talking procedure is about to be performed), the processor 102 may execute an authentication process (e.g., a voice verification process, a human face image verification process, or a fingerprint verification process) before outputting a voice corresponding to an oldest stored voice file (i.e., before performing the second talking procedure which is about to be performed). After the authentication process is passed, the processor 102 may output the corresponding voice (i.e., to perform the second talking procedure).

In an embodiment, the processor 102 further determines whether to execute the authentication process according location of the portable electronic device 100. For example, the processor 102 stores a safe location list which records a plurality of locations (predefined locations). The processor 102 may not execute the authentication process in response to the processor 102 determines that location of the portable electronic device 100 matches one of the locations in the safe location list. On contrary, the processor 102 may execute the authentication process in response to the processor 102 determines that location of the portable electronic device 100 does not match any of the locations in the safe location list. The locations of the safe location list may be set by the user of the portable electronic device 100.

In another embodiment, the processor 102 may further calculate a safety score of the portable electronic device 100 according to location of the portable electronic device 100, current time or/and current date, and then determines whether to execute the authentication process according to the calculated safety score. For example, the processor 102 may preset different safety scores respectively corresponding to different time periods of a day, set different safety scores respectively corresponding to different dates, and set different safety scores respectively corresponding to different locations. Then, the processor sums up the total safety score according to the location of the portable electronic device 100, current time or/and current date to obtain a calculated safety score, and the processor 102 then determines whether to execute the authentication process by comparing the calculated safety score with a safety threshold. In response to determining that the safety score is lower than the safety threshold, the processor 102 executes the authentication process. On contrary, in response to determining that the safety score is not lower than the safety threshold, the processor 102 would not execute the authentication process. The processor 102 may preset the safety threshold.

Based on the foregoing embodiments, the provided portable electronic device and the operating method for the same are capable of performing different talking procedures according to determined squeezing event/action, such that the user may simply squeeze the portable electronic device in different ways (e.g., different durations/strengths/number of times of the squeezing actions) to perform different (processes of) talking procedures, instead of turning on the screen (so saving battery power of the portable electronic device) or pressing some specific button (so saving the time required to identify the position of the button) to perform a specific talking procedure. Therefore, the portable electronic device and the operating method of the invention provide increased efficiency in the use of the portable electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operating method for a portable electronic device, wherein the portable electronic device comprises a screen, a body, and a sensor disposed on the body, the method comprising:
    determining whether a squeezing event is occurring based on a squeezing action sensed by the sensor;
    determining whether the squeezing event is a first squeezing event for performing a first talking procedure of a plurality of talking procedures or a second squeezing event for performing a second talking procedure of the plurality of talking procedures according to strength, duration, or count of the squeezing event which is determined as being occurring; and
    performing the first talking procedure in response to determining the squeezing event is the first squeezing event and performing the second talking procedure in response to determining the squeezing event is the second squeezing event wherein the first talking procedure and the second talking procedure are performed with other electronic devices without turning on the screen,
    wherein the first squeezing event and the second squeezing event are different, wherein the second talking procedure comprises:
    receiving and storing a first voice file from a second electronic device among the other electronic devices; and
    outputting a second voice from a speaker of the portable electronic device or sending a second voice file to the second electronic device.

2. The operating method for the portable electronic device according to claim 1, wherein the step of determining whether the squeezing event is the first squeezing event for performing the first talking procedure of the plurality of talking procedures or the second squeezing event for perfoiining the second talking procedure of the plurality of talking procedures according to the strength, the duration, or the count of the squeezing event comprises:
    determining whether the squeezing event is the first squeezing event or the second squeezing event by comparing the strength with a strength threshold, by comparing the duration with a time threshold, or by comparing the count with a count threshold.

3. The operating method for the portable electronic device according to claim 2, wherein the squeezing event is determined as the first squeezing event in response to the duration being longer than the time threshold, and the first talking procedure comprises:
    determining whether the first squeezing event keeps occurring;
    receiving, by a microphone of the portable electronic device, a first voice, generating and sending a first voice signal according to the received first voice to a first electronic device in response to determining that the first squeezing event keeps occurring.

4. The operating method for the portable electronic device according to claim 3, further comprising:
    determining whether a confirmation signal generated by the first electronic device is received by the portable electronic device; and
    generating a notification event in response to determining that the confirmation signal is received by the portable electronic device, wherein the notification event is for notifying that the first electronic device has received the first voice.

5. The operating method for the portable electronic device according to claim 1, further comprising:
    executing an authentication before performing the talking procedure;
    performing the talking procedure in response to the authentication being passed; and
    not performing the first talking procedure in response to the authentication being not passed.

6. The operating method for the portable electronic device according to claim 1, further comprising:
    determining whether a current location of the portable electronic device corresponds to a predefined location;
    executing an authentication process before performing the talking procedure in response to determining that the current location of the portable electronic device does not corresponds to the predefined location; and
    not executing the authentication process before performing the talking procedure in response to determining that the current location of the portable electronic corresponds to the predefined location.

7. The operating method for the portable electronic device according to claim 2, wherein the squeezing event is determined as the second squeezing event in response to the duration being not larger than the time threshold.

8. The operating method for the portable electronic device according to claim 7, wherein the second talking procedure further comprises:
    identifying, by the sensor, the strength of the second squeezing event or the count of the second squeezing event, wherein the count of the second squeezing event is obtained by counting a total number of times of squeezing action performed within a predetermined period starting from a first squeezing action of the second squeezing event; and
    determining whether to output the second voice from the speaker of the portable electronic device or to send the second voice file to the second electronic device according to the strength of the second squeezing event or the count of the second squeezing event.

9. The operating method for the portable electronic device according to claim 8, wherein the step of determining whether to output the second voice from the speaker of the portable electronic device or to send the second voice file to the second electronic device according to the strength of the second squeezing event or the count of the second squeezing event comprises:

signaling to the speaker of the portable electronic device to output the second voice according to the stored first voice file in response to determining that the strength of the second squeezing event is smaller than the strength threshold or the count of the second squeezing event is smaller than the count threshold, wherein the first voice file is received from the second electronic device among the other electronic devices and stored in the portable electronic device;

receiving, by a microphone of the portable electronic device, a third voice, and generating and sending the second voice file according to the received third voice to the second electronic device in response to determining that the strength of the second squeezing event is not smaller than the strength threshold or the count of the second squeezing event is not smaller than the count threshold.

10. The operating method for the portable electronic device according to claim 1, wherein the step of performing the first talking procedure in response to determining the squeezing event is the first squeezing event and performing the second talking procedure in response to determining the squeezing event is the second squeezing event comprises:

detecting by the sensor, that a sliding action is being performed on the sensor; and according to the slide action, choosing another electronic device among the other electronic devices to perform the talking procedure with.

11. The operating method for the portable electronic device according to claim 1, further comprising:

obtaining a current location of the portable electronic device;

determining whether the current location of the portable electronic device matches a predetermined location in response to determining that the squeezing event is occurring; and in response to determining that the current location matches the predetermined location, performing a predetermined operation corresponding to the predetermined location.

12. A non-transitory computer readable recording medium that records a program to be loaded by a portable electronic device with a screen and with a sensor disposed on a body of the portable electronic device to execute the following steps:

determining whether a squeezing event is occurring based on a squeezing action sensed by the sensor;

determining whether the squeezing event is a first squeezing event for performing a first talking procedure of a plurality of talking procedures or a second squeezing event for performing a second talking procedure of the plurality of talking procedures according to strength, duration, or count of the squeezing event which is determined as being occurring; and performing the first talking procedure in response to determining the squeezing event is the first squeezing event and performing the second talking procedure in response to determining the squeezing event is the second squeezing event, wherein the first talking procedure and the second talking procedure are performed with other electronic devices without turning on the screen, wherein the first squeezing event and the second squeezing event are different, wherein the second talking procedure comprises:

receiving and storing a first voice file from a second electronic device among the other electronic devices; and outputting a second voice from a speaker of the portable electronic device or sending a second voice file to the second electronic device.

13. A portable electronic device, comprising:

a screen;

a body, wherein a processor is disposed in the body; and a sensor disposed on the body, and coupled to the processor, wherein the processor determines whether a squeezing event is occurring based on a squeezing action sensed by the sensor, wherein the processor determines whether the squeezing event is a first squeezing event for performing a first talking procedure of a plurality of talking procedures or a second squeezing event for performing a second talking procedure of the plurality of talking procedures according to strength, duration, or count of the squeezing event which is determined as being occurring, and wherein the processor performs the first talking procedure in response to determining the squeezing event is the first squeezing event and performs the second talking procedure in response to determining the squeezing event is the second squeezing event, wherein the first talking procedure and the second talking procedure are performed with other electronic devices without turning on the screen, wherein the first squeezing event and the second squeezing event are different, wherein the second talking procedure comprises:

receiving and storing a first voice file from a second electronic device among the other electronic devices; and outputting a second voice from a speaker of the portable electronic device or sending a second voice file to the second electronic device.

14. The portable electronic device according to claim 13, wherein wherein the processor determines whether the squeezing event is the first squeezing event or the second squeezing event by comparing the strength with a strength threshold, by comparing the duration with a time threshold, or by comparing the count with a count threshold.

15. The portable electronic device according to claim 13, wherein a microphone is disposed on the body, and coupled to the processor, and the first talking procedure comprises:

the processor determines whether the first squeezing event keeps occurring, wherein, in response to determining that the first squeezing event keeps occurring, the microphone receives a first voice, and the processor generates a first voice signal according to the received first voice, and sends the first voice signal to the first electronic device, wherein the microphone does not receive the first voice in response to determining that the first squeezing event stops occurring.

16. The portable electronic device according to claim 13, the processor executes an authentication before performing the talking procedure, wherein the processor performs the talking procedure in response to the authentication being passed, wherein the processor does not perform the first talking procedure in response to the authentication being not passed.

17. The portable electronic device according to claim 13, wherein the processor determines whether a current location of the portable electronic device corresponds to a predefined location,
 wherein the processor executes an authentication process before performing the talking procedure in response to determining that the current location of the portable electronic device does not corresponds to the predefined location,
 wherein the processor does not execute the authentication process before performing the talking procedure in response to determining that the current location of the portable electronic corresponds to the predefined location.

18. The portable electronic device according to claim 14, wherein the squeezing event is determined as the second squeezing event in response to the duration is being longer than the time threshold.

19. The portable electronic device according to claim 13, wherein
 the processor obtains a current location of the portable electronic device,
 wherein the processor determines whether the current location of the portable electronic device matches a predetermined location in response to determining that the squeezing event is occurring,
 wherein, in response to determining that the current location matches the predetermined location, the processor performs a predetermined operation corresponding to the predetermined location.

20. The portable electronic device according to claim 13, wherein
 the sensor determines that a sliding action is being performed on the sensor, and
 the processor, according to the determined slide action, chooses another electronic device among the other electronic devices to perform the talking procedure.

* * * * *